Oct. 8, 1957  A. VANG  2,808,674
MEANS FOR CONTROLLING THE MOVEMENTS OF FISH
Filed Dec. 29, 1952  2 Sheets-Sheet 1

INVENTOR.
ALFRED VANG
BY
ATTORNEY.

Oct. 8, 1957  A. VANG  2,808,674
MEANS FOR CONTROLLING THE MOVEMENTS OF FISH
Filed Dec. 29, 1952  2 Sheets-Sheet 2

INVENTOR.
ALFRED VANG.
BY
ATTORNEY

United States Patent Office 2,808,674
Patented Oct. 8, 1957

2,808,674

MEANS FOR CONTROLLING THE MOVEMENTS OF FISH

Alfred Vang, Carmel, Calif.

Application December 29, 1952, Serial No. 328,292

1 Claim. (Cl. 43—17.1)

This invention relates to means and methods for guiding or attracting fish and more particularly for electrically inducing fish to become concentrated in a particular locality either to be taken from the water or to be, in turn, induced to move to another predetermined locality.

The advantages of attracting or guiding fish are manifold and range from enabling larger areas of waters to be fished with small nets to inducing the climbing of ladders and establishing new breeding beds as well as for the re-stocking of depleted lakes and streams.

I have found that not only can fish be electrically attracted to a given area but that, as explained below, the fish may be attracted somewhat selectively according to size and other categories. This enables not only a pre-sorting of fish to be taken by a net, but enables a partial size-segregation during growth so that fingerlings have a greater chance for survival.

While the greatest commercial value of my invention probably is in sea fishing, its value extends to hatcheries, hydro-electric power developments interfering with normal fish-habits, and the opening up of new breeding streams.

For the attainment of these and other objects and advantages I provide two widely spaced electrodes in the fish-inhabited waters. A series of brief uni-directional current pulses is applied to the electrodes to set up a difference in potential between the electrodes. The fish in the waters become attracted to the positive pole.

Figure 1:
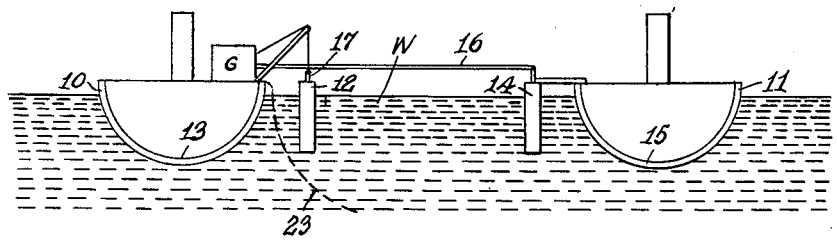
Figure 2:
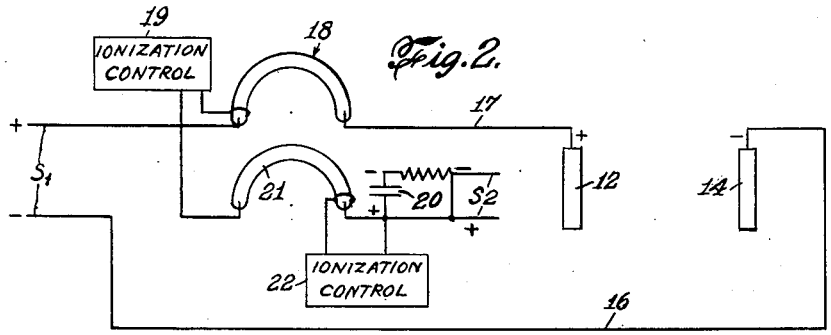
Figure 5:
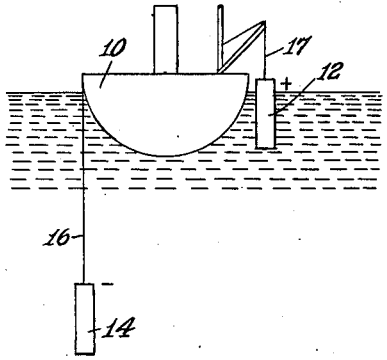
Figure 4:
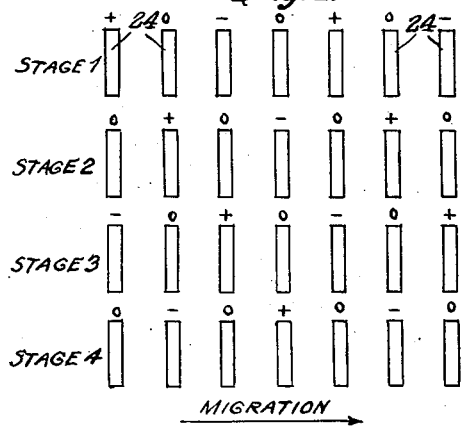
Figure 6:
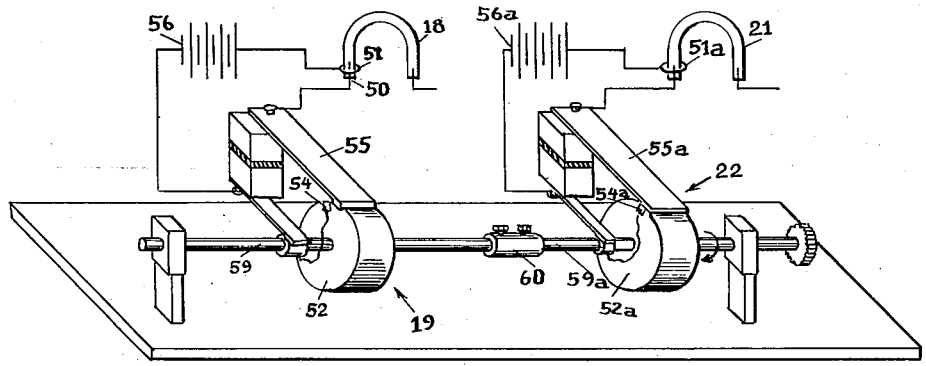
Figure 7:
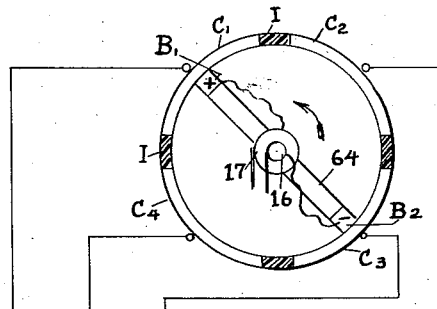
Figure 7:
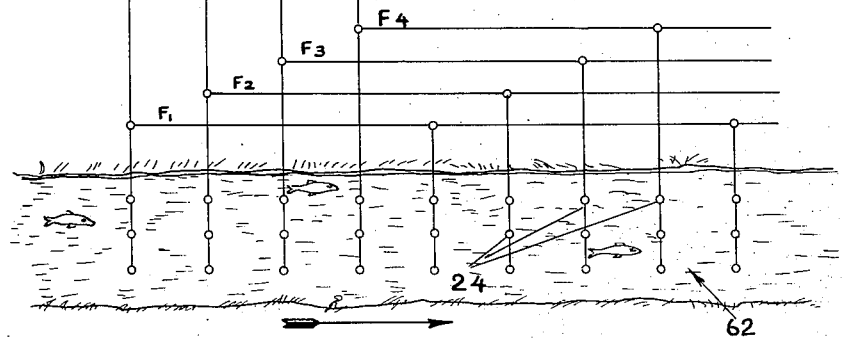
Figure 3:
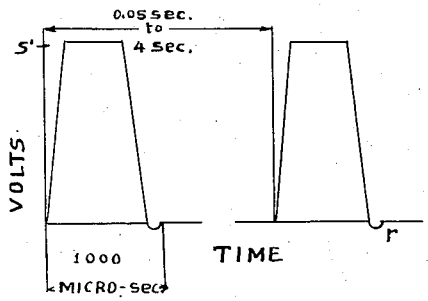

In the accompanying drawing showing, by way of example, three of many possible embodiments of the invention, Figure 1 is a schematic representation of one form of the invention adapted to ocean or lake net fishing, Figure 2 is a diagram showing means for supplying pulses to the electrodes, Figure 3 shows the wave form of the voltages applied to the electrodes, Figure 4 is an operational diagram showing how the polarity of a series of electrodes in a run will induce migration in a desired direction, Figure 5 shows a modification of the invention similar to that of Figure 1, Figure 6 is a schematic representation of the ionization controls for the means of Figure 2, and Figure 7 is a wiring diagram for effecting the polarity changes of electrodes in a stream in sequence as shown in Figure 4.

The invention as shown in Figure 1 comprises two separated floats such as boats 10 and 11 on a body of water W. An anode 12 is located in the vicinity of one of the boats, say, boat 10, on which the usual fishing operations are carried out, such as netting and canning. Since anodes are subject to corrosion it is preferable that the anode 12 be of some inert or cheap material such as carbon, stainless steel or iron. However the hull 13 of the boat 10 may be of iron and made to serve as the anode.

The other boat 11 is provided with a cathode 14 or the hull 15 may serve this purpose. Generally, there is no corrosion problem in use of the cathode and any suitable conductor may be used. Both anode and cathode, in whatever form employed, are at least partially within the water body.

The cathode 14 or hull 15 is connected to a generator G by means of an insulated cable 16 between the two boats or floats. The details of the generator G are shown in Figure 2 and the generator has an average power output of about 1 kw. if the electrodes are about 500 feet apart.

The generator G comprises a source of direct current $S_1$ connected to the electrodes 12 and 14 by means of conductors 17 and 16. A mercury discharge tube switch 18 such as described in my Patent No. 2,287,541 (June 23, 1942) is interposed in the conductor 17 and provided with an ionization control 19 for periodically connecting the source $S_1$ to the electrodes.

It is important that the source $S_1$ be removed or neutralized as quickly as possible. To accomplish this I throw a reverse potential across the switch 18. This is accomplished by connecting a charged condenser 20 by means of a second or blow-out switch 21, similar to switch 18, across the switch 18 to supply a slightly higher inverse potential across the switch 18 and so extinguish it. The blow-out switch 21 is timed by an ionization control 22 and the condenser 20 is trickle charged by a source $S_2$ of slightly higher potential than that of source $S_1$. The source $S_1$ has been satisfactory at 220 and 440 volts and voltages as high as 2000 may be used. The wave form of the voltage is shown in Figure 3 wherein it is noted that higher inverse potential causes a slight reverse net potential as at $r$.

The ionization controls 19 and 22 for the tubes 18 and 22 are detailed in Figure 6. Since the controls form no novel part of the invention they are shown as simple mechanically operated controls. As is well known in the art of discharge tubes, a tube such as 18 has a mercury pool electrode 50 and a control or trigger electrode in the form of a loop 51 around the outside of the envelope of the tube in the vicinity of the pool 50. A high potential difference (which may be even of the nature of different static charges) between the loop and pool will initiate ionization of the mercury of the pool. Once this ionization is initiated the tube will become and remain conductive with only about twenty volts drop across it. Such a tube is an excellent means to turn on high voltage current.

The control 19 is shown as a revolving disk 52 of insulating material having a small conductive bar 54 thereon for periodic engagement, as the disk rotates, with a brush 55 connected to the pool 50. A source of current 56 is permanently applied to the trigger electrode 51 and the segment bar 54 in conventional manner as shown. When the bar 54 engages the brush 55 the tube is ignited and remains ignited if the source $S_1$ is sufficient to maintain a twenty volt drop across it in spite of the resistance of the water between electrodes 12 and 14. Since the period for the tube 18 to remain conductive is short, the ignition potential from source 56 must not remain applied to the electrodes 50 and 51 and the bar 54 must be narrow. But, assuming a sufficient supply from $S_1$, the tube remains conductive after switch 54, 55 has opened.

To extinguish the tube 18 an inverse potential must be applied to it and it must in practice be a high potential but need be little more than momentary. For this reason the condenser 20, trickle charged by $S_2$ is ideal and it is "switched" on by tube 21. Tube 21 is timely ignited by a corresponding trigger electrode 51a connected to a similar ignition source of potential difference 56a controlled by a mechanism 52a, 54a, 55a similar to 52, 54, 56, the two disks being preferably on alined shafts 59 and 59a and joined by a coupling 60. The switch 54a, 55a closes momentarily after switch 54, 55 opens.

It will be observed that varying the angle of lag between switches 54, 55 and 54a, 55a the duration of current flowing through the water may be varied and by varying the speed of the connected shaft the intervals between current flow can be varied. In practice, for short intervals between current flow resistance-capacitor electrical timers, well known, may be preferable.

The intermittent application and neutralizing of the potential of member $S_1$ gives a nearly square wave form of voltage which is most effective for affecting fish in the water body W. The fish always are attracted to the anode. However a variation in the rates of repetition of the potential pulses has a remarkable effect. The rate of repetition has a selective effect on the size of the fish attracted when the duration of the pulse is of the order of 1000 micro seconds. If there is a repeated pulse every 4 seconds large fish predominate in the schools attracted while a pulse every 0.05 second is necessary to attract the smallest. There is evidence that variation of the repeated rates has a selective effect on the attraction according to sex and species.

The duration of the pulse may be varied somewhat provided it is small compared with the time interval between pulses. It is to be noted that while the average power output is small, the energy of a single pulse or the instantaneous power may be a thousand fold greater or more.

The fish may be induced to migrate in a predetermined direction, say up a stream, by having a series of electrodes situated in and along the stream and changing the polarity of a given electrode so that, in effect, an anodic field advances in the intended direction of migration. When such a series is employed it is desirable to have at least one neutral "electrode" between anode and cathode lest there be as much inducement in one direction as in the reverse. Thus for any given one of the series of electrodes 24 in Figure 4 the charge in stage 1 is, say, positive, and fish are attracted thereto. In the next stage that electrode becomes neutral, and the next electrode upstream becomes positive drawing the fish toward it. There is little tendency for the fish to go down stream where they may meet a cathode. An inspection of Figure 4 shows that anode and cathode are always separated by a neutral pole and any one pole goes through the cycle: positive, neutral, negative, neutral, and back to positive with all poles remaining in their existing condition the same length of time.

A wiring diagram for changing polarity in the sequence of Figure 4 is shown. The series of electrodes 24 are in and up and down a stream 62 and every fifth electrode is connected to a common wire so that there are four feeders $F_1$, $F_2$, $F_3$ and $F_4$. The four feeders are in turn connected to four arcuate conductors $C_1$, $C_2$, $C_3$, $C_4$ of equal length and separated by insulators I. A pair of brushes $B_1$, $B_2$, shown on a diametric carrier 64 engage opposite conductors such as $C_1$, $C_3$ or $C_2$, $C_4$. These brushes are connected by well known means, as shown, to the conductors 16, 17 of Fig. 2 and maintain a constant polarity, $B_1$ positive and $B_2$ negative as the two engage opposite pairs of arcuate conductors when the carrier 64 rotates. Tracing polarities it will be seen that a sequence of changes will occur as shown in Figure 4 upon rotation of the carrier and brushes.

It may be noted that the speed of rotation of carrier 64 need not necessarily be one fourth that of the shaft of the ionization controls. The periodic application of current is determined more by the nature and size of the fish. Certain time periods and intervals are more effective to induce the fish to move, but the rate of change of polarity will depend on how fast it can and will swim rather than on the frequency necessary to induce it to move in a particular direction.

If the stream is wide a plurality of electrodes connected together and transverse the stream is preferable to a single electrode as this combination really forms a multi-pronged electrode presenting less physical obstruction to fish movement and yet producing a good field. Generally it is advisable when migration is to be controlled to space the metallic portions permanently and rather closely, such as a few feet apart, so that low voltages may be used. In practice a system whereby a fish will always be within a few feet of a charged portion of an electrode is preferable to minimize voltage requirements.

Of course the cathode 14 of Figure 1 need not be held on a second boat but it may sweep lower water levels and be suspended from the boat 10 as shown in Figure 5 to bring to the surface waters fish which are ordinarily out of reach of surface nets. In any event the fish attracted to an anode may be taken in the usual manner by a net 23 (Figure 1). If desired, the anode may be hauled in, after the fish have collected, to facilitate the netting.

The reason why fish are induced to move toward an anode is not understood, particularly when the interval between pulses has a selective effect. Were it merely due to a liberation of oxygen, the pulse interval should have no effect.

The salinity of the water affects results to some extent but variations of the salinity can be counteracted by slight variations in time intervals between pulses as well as in the pulse duration and a change in voltage.

The pulses are all substantially uni-directional, though the net reverse potential $r$ may be of benefit in removing minute gas particles held to the electrodes by static attraction.

*Example I*

A distance between electrodes 12 and 14 of about 400 ft. in salt water operating at about 1 second intervals for about 1000 micro-second pulses, on a 1 kw. generator is satisfactory for commercial fishing. Operating voltages are difficult to determine because ordinary instruments do not respond to rapid changes.

*Example II*

A distance between electrodes of about two feet in fresh water operating at about B cycles per second with a current duration of about 1000 micro-seconds induced satisfactory movement of commercial sized fish at a voltage of about 110 for the source $S_1$.

I claim as my invention:

A method for inducing fish within a body of water containing the fish to migrate in a predetermined direction and having a multiplicity of electrodes fixed in the water and extending in said direction, said method comprising applying a unidirectional current intermittently to two of said electrodes and leaving an electrode between said two electrodes neutral, then applying said current to the previously neutral electrode and to the second electrode in said direction to produce an advancing potential difference between the electrodes in said direction.

References Cited in the file of this patent
UNITED STATES PATENTS

| | | |
|---|---|---|
| 2,163,282 | Hovden | June 20, 1939 |
| 2,233,043 | Bonner et al. | Feb. 25, 1941 |
| 2,238,897 | Gomez | Apr. 22, 1941 |
| 2,426,037 | Mahoney et al. | Aug. 19, 1947 |
| 2,745,205 | Kafka | May 15, 1956 |

FOREIGN PATENTS

| | | |
|---|---|---|
| 176,096 | Great Britain | Feb. 27, 1922 |

OTHER REFERENCES

Electronics Dictionary, by N. M. Cooke and John Markus, page 173. Published 1945 by McGraw-Hill Book Co. Inc., New York, N. Y.